March 6, 1951
J. A. MELENRIC
2,543,864
JET PROPULSION UNIT WITH ROTATABLE COMBUSTION CHAMBER
Filed Dec. 22, 1947
4 Sheets-Sheet 1
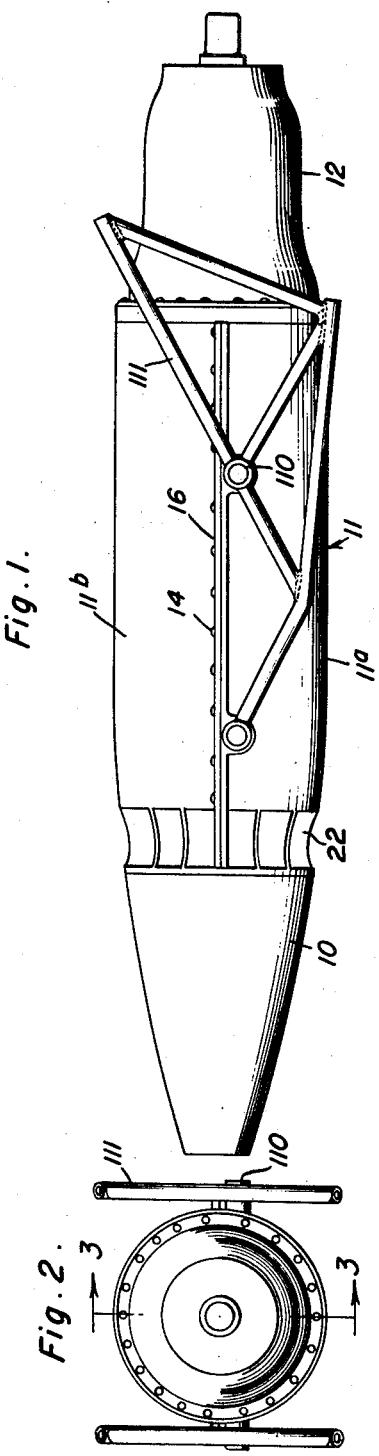
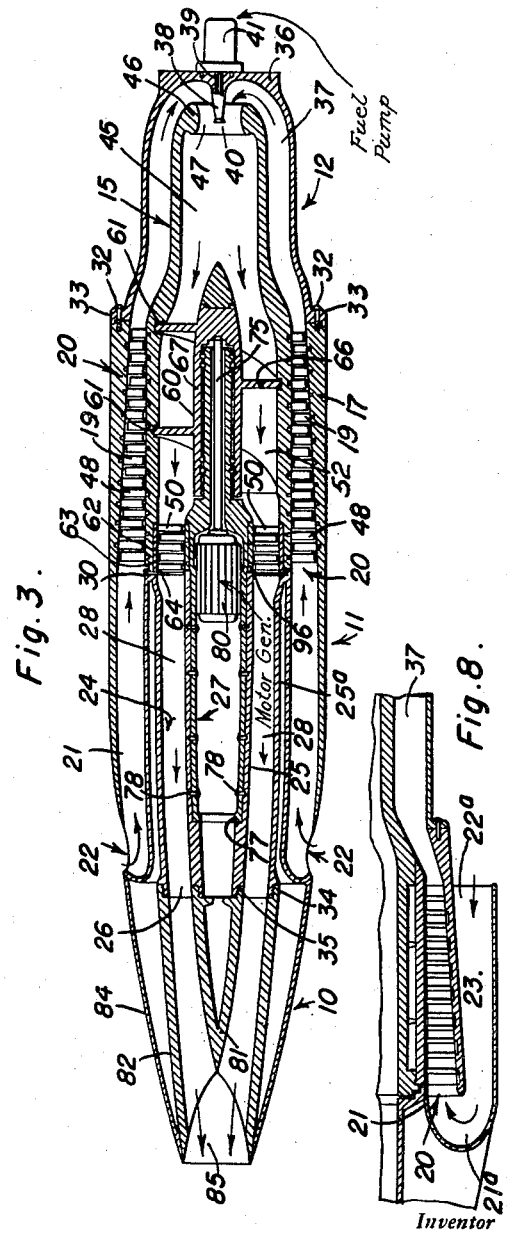
Inventor
John A. Melenric
By Clarence A. O'Brien
and Harvey B. Jacobson
Attorneys March 6, 1951
J. A. MELENRIC
2,543,864
JET PROPULSION UNIT WITH ROTATABLE COMBUSTION CHAMBER
Filed Dec. 22, 1947
4 Sheets-Sheet 2
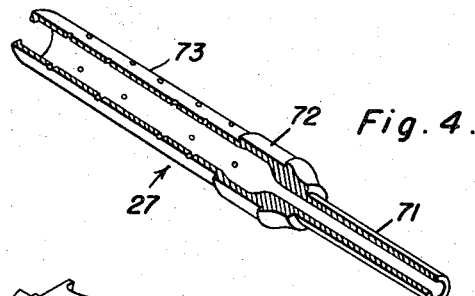
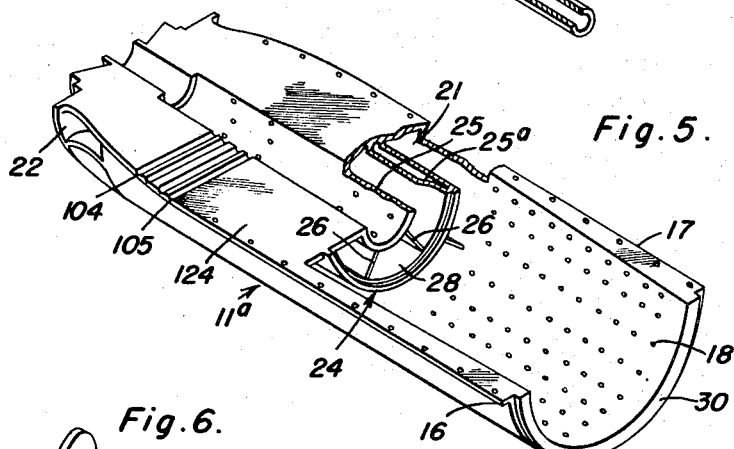
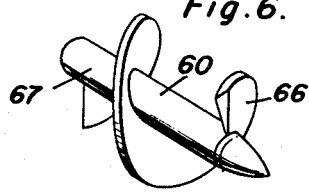
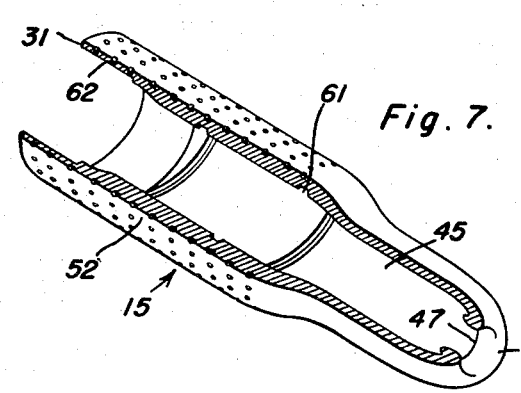
Inventor
John A. Melenric
By Clarence A. O'Brien
and Harvey B. Jacobson
Attorneys March 6, 1951

J. A. MELENRIC 2,543,864

JET PROPULSION UNIT WITH ROTATABLE COMBUSTION CHAMBER

Filed Dec. 22, 1947

John A. Melenric
INVENTOR.

BY
Attorneys

March 6, 1951  
J. A. MELENRIC  
JET PROPULSION UNIT WITH ROTATABLE COMBUSTION CHAMBER  
2,543,864

Filed Dec. 22, 1947

Inventor  
John A. Melenric

By Clarence A. O'Brien  
and Harvey B. Jacobson  
Attorneys

Patented Mar. 6, 1951

2,543,864

UNITED STATES PATENT OFFICE 2,543,864

JET PROPULSION UNIT WITH ROTATAB COMBUSTION CHAMBER

John A. Melenric, Charleston, W. Va.

Application December 22, 1947, Serial No. 793,243

10 Claims. (Cl. 60—35.6)

This invention relates to improvements in jet propulsion assemblies and it has for its principal object to provide a simple and effective propulsion unit of high thermal efficiency which distributes the heat engendered evenly over the entire surface of the parts exposed to it.

More specifically it is an object of the invention to improve combustion, the mixing of the combustion gases, and the heat distribution within and around the combustion chamber by locating said chamber within a rotatable member.

A further object of the invention consists in providing a constant air flow around the rotatable combustion chamber and in diverting said air flow into the combustion chamber at its end so as to produce effective cooling of said chamber along with a heating of the air necessary for combustion.

A further object of the invention consists in providing a self-contained unit, arranged in such a way that a flow of gases in a substantially straight line is obtained, the flow originating in a rotatable member and passing subsequently to fixed members, providing the power for driving said rotating member during this passage.

A further object of the invention is the reduction of friction and the simplification of the lubrication problems of jet propulsion units.

A further object of the invention is the simplification of the construction of the unit, by using a single unit with members which are simultaneously flow directing and compression or power producing and so arranged that they provide for a flow of the combustion gases in a substantially straight line.

A still further object consists in an arrangement of the sections and parts permitting support of the rotatable member arranged inside of a fixed member at the center near the axis of rotation, by a system of fixed parts fulfilling multiple functions, arranged around and within the movable parts.

Further, more specific objects will be apparent from the following specification referring to the accompanying drawings.

The invention is illustrated in the accompanying drawings which show one embodiment thereof by way of example, together with a modification of one member thereof. It is however to be understood that the examples shown intend to explain the principle on which the invention is based and the best mode in which it is contemplated applying said principle but are not to be regarded as the sole modifications incorporating the invention. Further modes of applying the invention are therefore not to be considered as departures from the invention as explained below.

In the drawings:

Figure 1 is an elevational side view of the jet propulsion unit according to the invention.

Figure 2 is an elevational end view of the same.

Figure 3 is an elevational longitudinal sectional view of the unit, the section being taken along the vertical median plane of symmetry, indicated at 3—3 in Figure 2.

Figure 4 is an isometric view partly in section of one of the inner members forming the central internal support.

Figure 5 is an isometric view of one of the outer supporting members housing the compressor and air intake and supporting the internal support members.

Figure 6 is an isometric view of a detail.

Figure 7 is an isometric view partly in section of the rotatable inner member forming the combustion chamber.

Figure 8 shows the modified contour of the air intake mamber in the event that it is thought to be of advantage to utilize the pressure of the outer air due to the velocity of the plane or missile.

Figure 9:
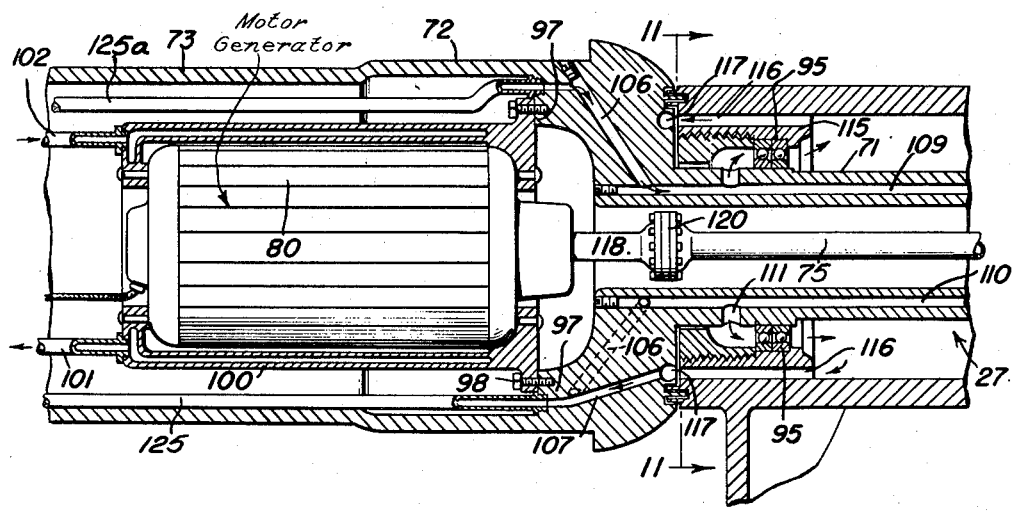
Figure 9 is an elevational sectional view on an enlarged scale of the middle section taken along line 3—3 of Figure 2.
Figure 10:
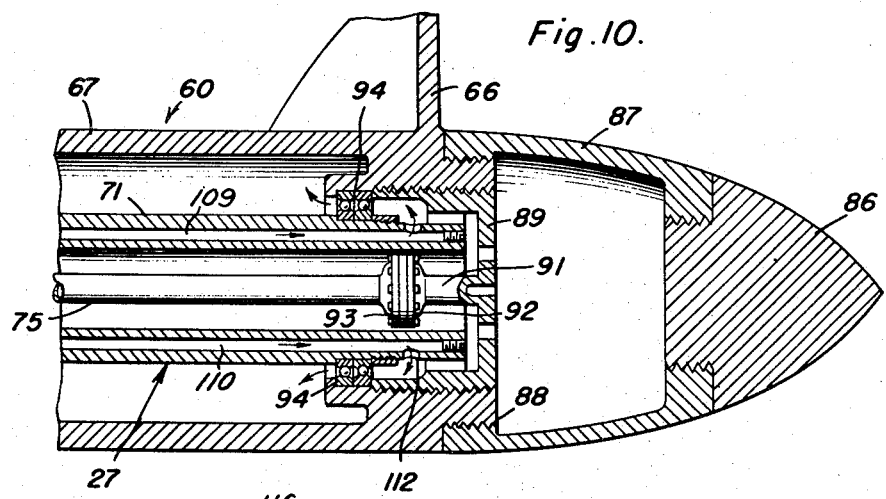
Figure 10 is an elevational sectional view on an enlarged scale of the front end of the hub member taken along line 3—3 of Figure 2.
Figure 11:
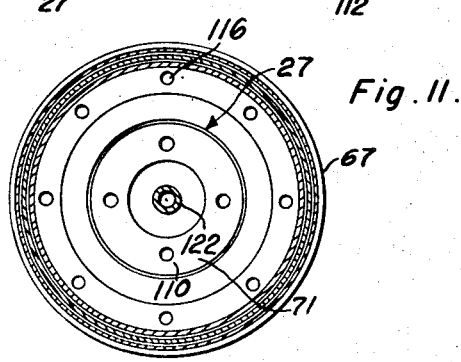
Figure 11 is a cross sectional elevational view taken along line 11—11 of Figure 9.

The jet propulsion unit according to the invention is adapted to be built into the aft part of an airplane or missile (a connection which is not shown) and consists of a number of fixed air and gas flow directing sections 10, 11, 12 and of an inner or central rotating section 15 which carries the movable blades or vanes and contains the combustion chamber.

The middle section 11 is approximately cylindrical on its outside but preferably is subdivided and consists of two approximately half cylindrical members 11a, 11b joined by bolts or rivets 14. Suitable flanges 16, as shown in Figures 1 and 5 may be provided for this purpose. This section essentially carries the fixed parts of the compressor and directs the air necessary for combustion towards it. It also forms the main outer support for the internal supporting members. This part is held on the fuselage of the plane or missile by means of a bracket indicated at 111 by means of trunnions 110 projecting from it.

As seen from Figures 3 and 5 the middle section 11 comprises a compressor portion 17 holding the fixed blades 19 of an axial flow compressor 20 and a channel portion 21 leading or conducting the air to the said compressor. The compressor portion is conical on the inside and is provided with holes 18 (Figure 5) serving for the fixation of the fixed blades 19. The channel portion 21 leads to an admission opening 22 where the air enters.

When it is intended to utilize the pressure of the air against a plane or missile in motion to increase the initial air pressure of the compressor, it is preferable to add a further channel 23, Figure 8, on the outside connected with the channel portion 21 by a flow reversing section 21a. The opening 22a in this case, may face the direction of motion of the plane or missile.

The middle section 11 moreover comprises a supporting and gas flow directing tubular portion, generally indicated at 24 in Figure 5, which preferably is formed by two separate cylindrical walls 25, 25a enclosing annular gas channels 28. Supporting ribs 26 are arranged between these walls. The internal or central cylindrical wall 25 forms a kind of hub member and is adapted to be joined by means of rivets or bolts to an internal support 27 to be described below. The ribs are so arranged that the free flow of the gases through the tubular portion is not impeded or disturbed. The ribs of portion 24 which are in the plane of partition of the members 11a and 11b may form a closure plate or wall 124 which reach beyond the portion 24 and, bridging the channel 21, are joined to the flanges 16. Channels 104, 105 may be formed in the said closure plate or wall 124 for the passage of ducts to be described below. On account of the difference of pressure in the air channel 21 and the gas channel 28 a seal 30 such as a labyrinth seal is arranged, indicated in the drawing by two protruding ledges entering recesses (not shown) on the opposing member. It is to be understood however that this seal may be built in any approved way.

At its ends the middle section 11 is provided with means for joining it to the adjacent sections 10 and 12. A flange connection is shown at the front end of section 11 which is obtained by means of bolts 32 passing through a flange 33 in member 12. A threaded connection 34, 35 is shown at the other end of section 11 where the inner tubular portion 24 joins the tubular exhaust section 10. It will be understood however that these connections are merely shown by way of example and may be replaced by other approved connections suitable under the circumstances.

The rear section 10 consists of an inner conical or nearly conical center piece 81 surrounded by a frusto-conical tube 82, joined to the former by ribs. An outer shell 84 encloses this structure which is fastened by means of the screw threaded portions 34, 35 to the middle section 11.

The fixed front section 12 joined to the middle section 11 by means of the flanges 33 and bolts 32, forms a shell enclosing the front end of the unit and terminates in a head 36. It also encloses the front portion of the rotatable member 15 at such a distance that between it and the latter an annular channel 37 is formed leading the air from the compressor 20 towards the end portion or head 36. On the inside head 36 is bell shaped, as seen in Figure 3, and is provided with a central spur or projection 38 so as to form a flow reversing deflector for the air streaming through the channel 37. This spur or projection 38 projects into the rotatable section 15 which is open at its end. It is pierced by a fuel duct 39 which leads to peripherally arranged fuel discharge openings. The spur at its end supports the spark plug 40 of the combustion chamber.

The fuel duct 39 may be connected with a fuel pipe carrying liquid fuel under pressure or may be connected with a fuel pump 41 directly seated on the head 36 as shown. This pump is connected with a fuel tank in a manner not shown.

Within section 12 the inner or rotatable section 15 is arranged which contains the combustion chamber 45 and carries the movable blades or vanes 48, 64 of the axial flow compressor 20 and of the axial flow turbine 50 respectively.

The front end of this section is formed by a rounded or dome shaped head portion 46 provided with a large admission opening 47 through which the compressed air streaming through the channel 37 and along the flow reversing deflector 36 and the fuel injected through duct 39 is admitted. Adjacent to the rounded or dome shaped portion 46 a substantially cylindrical portion forming the combustion chamber proper is arranged. This portion leads to another cylindrical portion 52 of a larger diameter which constitutes the blade or vane carrying portion of the rotatable member and which is moreover connected with the hub portion 60 supporting the rotatable member.

As will be seen from Figures 3 and 7 the inner wall of this portion is provided with a helical groove or recess 61 for a purpose to be described. The end portion 62 is recessed and carries a blade carrying cylinder 63 or a plurality of such cylinders with which the movable blades 64 of the axial turbine 50 are integral or with which they are fixedly connected.

The hub member 60 consists of a hollow cylindrical member 67 pointed towards the combustion chamber in the manner of a bullet or shell in order to deflect the gases generated in the combustion chamber. This member is provided with a helical web 66 which supports the rotatable member. The web enters into the helical groove 61 and is held therein. It will be understood that the pitch of the helical web is so chosen that it will offer the least resistance to the passage of the gases at the predetermined or normal rotational speed of the section 15.

The member 60 may consist of several parts joined by threading them into each other. It may especially comprise a pointed nose portion 86 held by a tapering intermediate piece 87 which in its turn is threaded at 88 into the end of the cylindrical member 67. Thereby the hollow interior of member 67 is rendered fully accessible. This cylindrical portion may be closed by a special plug member 89 which has a centrally projecting tubular portion 91 ending in a coupling disk 92, adapted to be coupled by means of a similar disk 93 with a shaft 75 to be described below.

The hollow cylindrical member 67 is journaled for rotation on a supporting member 27 shown in Figures 3, 4, 9 and 10. This member is hollow and is provided at its outside with a number of stepped cylindrical surfaces 71, 72, 73. The cylindrical section 71 on the front end is of the smallest diameter and is located within the hollow cylindrical section 67 of member 60 and supports it for rotation by means of ball bearings 94, 95.

The second section 72 of the member 27 is of a larger diameter and supports the fixed blade cylinder 96 of the axial turbine 50 the movable blades 64 of which are mounted on the cylindrical section 63 carried by the end portion 62 of member 15 as above described.

The third section 73 of member 27 is of a somewhat reduced diameter and fits into the hollow cylindrical tubular portion 25 of the member 11. It is secured to it by means of rivets 78, bolts or the like. To guard against axial movement and to secure a firm seat the member 25 may be provided with a stepped portion 77 against which the end of section 73 abuts.

Within the hollow interior of the two sections 72 and 73 a motor 80 is housed and supported which forms the starting motor of the unit. This motor may however be of such a type that it can simultaneously perform the function of a current generator furnishing the current servicing the unit and its accessories during operation.

Figure 12:
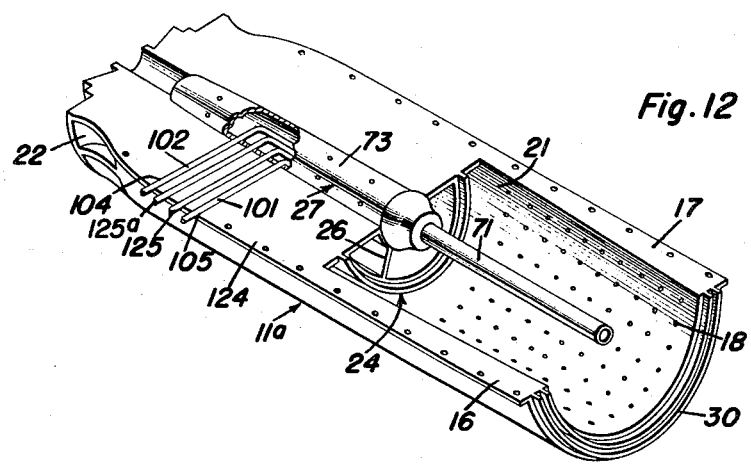
Figure 12 is an isometric view of the outer supporting member with the inner member inserted.
Figure 13:
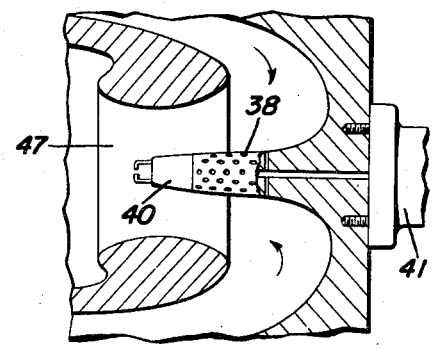
Figure 13 is an enlarged sectional elevational view of the end of the combustion chamber.
Figure 14:
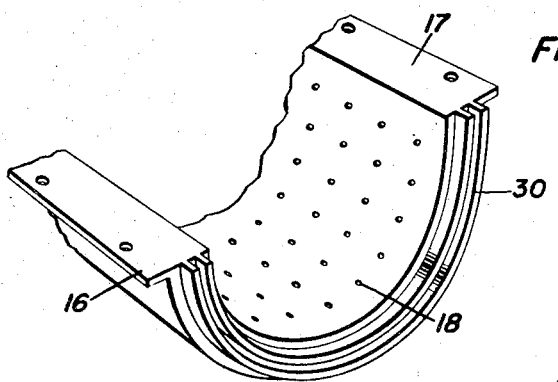
Figure 14 is an isometric view of the end of the outer member.

The motor is supported on an internal head 97 provided at the point where the section 71 joins section 72 by means of screw bolts 98. Additional supports (not shown) may be provided if necessary. The motor is surrounded by a jacket 100 through which a cooling fluid may be circulated. This fluid is supplied by conduits 101, 102 which are passing to the outside through channels 104, 105 provided in the wall 124 of member 24. (Figures 5 and 12.)

The internal head 97 is also provided with lubricating ducts 106, 107. The lubricating ducts 106 are connected with further longitudinal ducts 109, 110 leading through the section 71 to the front end of said section. Ports 111, 112 provided in these ducts are conducting the lubricant to the ball bearings 94, 95 respectively. The lubricant discharged from the ball bearings may be led back in a separate pipe or conduit but in the example shown, the lubricant is simply allowed to drop into the hollow interior of member 60 where it will form a film on the wall advancing towards the end with the internal head 115 where the lubricant may pass through the channels 116 into a collecting channel 117 on the stationary member 27 connected with the duct 107. The ducts 107, 106 are connected with pipes 125 and 125a leading to the outside through further channels parallel to the channels 104 and 105 in members 11a and 11b (Figure 12).

The shaft 118 of motor 80 is coupled by means of the disk coupling 120 with the extension shaft 75 passing through the hollow interior of section 73 which in its turn is coupled by means of coupling disks 93, 92 with member 60, which is thereby driven by the motor when the latter is supplied with current. Conversely the motor is driven when members 15 and 60 rotate.

In order to assemble the unit, member 60 may first be placed in member 71 without the parts 89, 87 and 86 which are mounted later. Then the motor 80 surrounded by jacket 100 and with shaft 75 attached is mounted within members 73 and 72 and the pipe connections are made. The fixed blade cylinder 96 is mounted on member 72, the stopper 89 is inserted at the end and the member 92 is joined to member 93, suitable holes in the stopper 89 permitting this operation. After assembly of these parts, parts 87 and 86 may be mounted.

The member 15 on which the blades 19 have been mounted is thereafter moved into place and connection with the (divide) outer blade cylinder 63 which has previously been moved into place is then made in the usual manner.

The entire unit is now fixed within the divided central hub members 25 by riveting, the arm of the riveting machine being introduced through one of the open ends of the gas channel 28. The end members 12 and the outlet members 10 may then be attached to the central portion.

The operation of the unit will be clear from the foregoing description.

When the inner member 15 is in rotion, air is either sucked in or pressed in by the compressor unit 20, operating by means of the fixed vanes 19 on section 11 and the movable blades 48 on section 52 of rotatable member 15. The desired progressive reduction of the cross sections in the axial compressor 20 may be produced by means of the conical inner face of the portion 17.

The channel 21 leading to the compressor may be funnel shaped. The heated air streaming out of the compressor and heated to around 600° F. is further heated by streaming through channel 37 along the outer side of the combustion chamber 45 which is cooled by this action. At this point the air will have acquired a temperature of about 750° F. The hot air and the fuel injected into it, after the air has passed the flow reversing head and has entered admission opening 47 is ignited upon entering chamber 45 and the combustion gases which now have a temperature of about 1500° F. near the combustion point flow through turbine 50 thus rotating member 15 which carries its moving blades 48. The rotation of the combustion chamber not only furnishes the power necessary for compression in a very simple manner, but also distributes the heat produced in said chamber and the cooling effect due to the streaming air evenly over the surface of the rotating member.

The gases after having passed the turbine 50 have a temperature of about 950° F. They flow through the channels 28 and 83 and escape through the expulsion end 85 of the section 10. The temperature at this point will be about 900° F.

It will be noted that minor constructive changes will not affect the principle on which the invention is based or the mode of its application as far as they are included in the annexed claims.

Having described the invention, what is claimed as new is:

1. In a jet propulsion arrangement a unit consisting of a stationary outer member and a rotatable inner member, the said inner member containing the combustion chamber and carrying movable compressor vanes on the outside and movable turbine blades projecting inwardly from the outer wall, said outwardly projecting vanes cooperating with fixed compressor blades mounted on the outer member, a further stationary inner tubular member provided with a centrally arranged jet discharging exhaust opening, said member carrying fixed turbine blades, cooperating with the movable blades, said inner member being provided with curved tapering outer and inner walls enclosing an annular passage leading towards said central exhaust opening.

2. In a jet propulsion arrangement a unit comprising a plurality of stationary sections attached to each other and a rotatable member, said stationary sections including outer sections forming an outer shell surrounding and enclosing the rotatable member, and internal sections, forming a unitary structure enclosed by and attached to said outer sections, an elongated combustion chamber arranged within the rotatable member, consisting of substantially cylindrical sub-sections, one of said sub-sections being provided with means for producing an annular flow of gases, a compressor with stationary and movable blades, the former carried by an outer stationary section and the latter arranged on the outside of the rotatable member, a turbine with stationary and movable blades the former carried by the internal section and the latter by the rotatable member near its outlet end, the internal sections including a tubular unit with a centrally arranged jet discharging exhaust opening, said tubular unit being provided with curved tapering outer and inner walls enclosing an annular passage leading towards said central, jet discharging exhaust opening, said annular passage being aligned with and forming a direct continuation of the annular flow sub-section of the combustion chamber.

3. In a jet propulsion arrangement a unit comprising a plurality of stationary sections and a rotatable member, said stationary sections including outer sections forming a unitary structure, surrounding the rotatable member, a combustion chamber within said rotatable member consisting of substantially cylindrical sub-sections of different diameter, a central section arranged within the rotatable member and forming its support for rotation, said central section being arranged within the sub-section of the combustion chamber nearest to the exit end and producing an annular flow of gases through this portion of this combustion chamber, said central section being held by a stationary section arranged centrally with respect to the outer sections, and air compression means with cooperating fixed and movable blades carried on the inner side of the stationary sections and on the outer side of the rotating member respectively.

4. In a jet propulsion unit an outer stationary assembly comprising a plurality of sections including an end section, a tubular inner centrally located supporting member, a tubular gas flow directing section filling part of the inside of said outer sections of the assembly and supporting said inner central member, a rotatable member with an admission opening and a discharge end arranged within one of the above named sections of the outer stationary assembly and within an end section, the latter being arranged at a distance from the rotatable member to form an annular channel around the same, a compressor with stationary parts mounted on the first named section of the outer assembly and with movable parts cooperating with said stationary parts mounted on the outside of the rotatable member, said compressor delivering compressed air into the annular channel, a flow reversing head on said outer end section at the end of the annular channel for directing the compressed air flowing around the rotatable member into the admission opening of the same, fuel injecting and igniting means in said flow reversing head, movable turbine blades on the discharge end on the rotatable member, and stationary turbine blades cooperating therewith, arranged on the central inner section, the turbine discharging into the tubular gas flow directing section filling part of the inside of sections of the outer stationary assembly, a jet discharge section attached to said tubular section, an electric motor arranged within and enclosed by the said inner tubular centrally located supporting member, a drive shaft associated with said electric motor, an inner rotatable member, supported on said centrally located supporting member, means for connecting the said inner rotatable tubular supporting member with the first named rotatable member, and means for coupling the drive shaft of the electric motor with the said inner rotatable member.

5. In a jet propulsion unit a plurality of outer sections, including an end section, forming an outer stationary assembly, one of said sections being of substantially cylindrical shape and being divided into two separate half-cylindrical sub-sections, each provided with closure plates in the plane of partition, means for joining said two sub-sections to form a complete cylindrical unit, said closure plates being provided with transverse channels leading to the outside, a tubular inner centrally located supporting member, a tubular gas flow directing section coaxial with the supporting member filling part of the inside of said outer section and supporting said inner central supporting member, a rotatable member with an admission opening and a discharge end axially aligned with said tubular gas flow directing section, arranged within one of the above named outer sections and within one outer end section, the latter being arranged at a distance from the rotatable member to form an annular channel around the said rotatable member, a compressor with stationary parts mounted in the first named outer section and with movable parts cooperating with said stationary parts mounted on the outside of the rotatable member, said compressor delivering compressed air into the annular channel, a flow reversing head on said outer end section at the end of the annular channel for directing the compressed air flowing around the rotatable member into the admission opening of the same, fuel injecting and igniting means in said flow reversing head, movable turbine blades on the discharge end of the rotatable member, and stationary turbine blades cooperating therewith arranged on the central inner member, said turbine discharging into the tubular gas flow directing central inner section filling part of the inside of an outer section, a jet discharge section attached to said tubular section, an electric motor arranged within the said inner centrally located tubular member, said motor being provided with a cooling jacket, pipes leading to and from the cooling jacket to carry cooling fluid to and from the jacket, said pipes passing through the transverse channels in the closure plates of the half-cylindrical sub-sections, a drive shaft associated with said electric motor, an inner rotatable member supported on said centrally located supporting member, means for connecting the inner rotatable member with the first named rotatable member, and means for coupling the drive shaft of the electric motor with the said inner rotatable member.

6. In a jet propulsion unit a plurality of outer sections forming an outer stationary assembly, one of said sections being an end section, another of said sections being substantially of cylindrical shape and being divided into two separate half-cylindrical sub-sections, each being partly closed in the plane of partition by a closure plate, means for joining said two half-cylindrical sections so as to form a complete cylindrical unit, said closure plates being provided with transverse channels leading to the outside, a tubular inner centrally located supporting member, a tubular gas flow directing section filling part of the inside of said outer sections and supporting said inner central supporting member, a rotatable member with an admission opening and a discharge opening axially aligned with the tubular gas flow directing section and arranged within one of said above named outer sections and within an outer end section, the latter being located a distance from the rotatable member so as to form an annular channel around the said rotatable member, a compressor with stationary blades mounted in the first named cylindrical outer section and with movable blades cooperating with the said stationary blades mounted on the outside of the rotatable member, said compressor delivering compressed air into the annular channel, a flow reversing head on said outer end section at the end of the annular channel for directing the compressed air flowing around the rotatable member into the admission opening of the same, fuel injecting and igniting means in said flow reversing head, movable turbine blades on the discharge end of the rotatable member, and stationary turbine blades cooperating therewith arranged on the tubular supporting central inner member, said turbine discharging into the tubular gas flow directing section, a jet discharge section attached to said tubular section, an electric motor arranged within the said inner centrally located tubular supporting member, a drive shaft associated with the electric motor, a hollow inner rotatable member, bearings supporting the same for rotation on said centrally located supporting member, the latter being provided with axially directed lubricating channels and radial openings leading from said channels to said bearings, means for connecting the said inner rotatable member with the first named rotatable member, coupling means for connecting said inner rotatable member with the drive shaft, lubricating pipes leading through the transverse channels in the closure plates of the half-cylindrical subsections to the interior of and through the tubular inner centrally located member and connecting channels between said pipes and said longitudinal lubricating channels in the supporting member to produce a steady flow of lubricant to the bearings of the supporting member.

7. In a jet propulsion unit, a plurality of stationary sections, including outer sections, and a centrally located inner section, means connected with said outer section for holding said inner section, a rotatable member enclosed by said outer sections, an annular channel formed between said outer sections and said rotatable member, a rotating axial compressor with stationary and movable blades between an outer stationary section and said rotatable member in front of said channel, to furnish compressed air through said channel, a flow reversing head in said outer section to direct said compressed air into the interior of said rotatable member, means for injecting fuel into the interior of said rotatable member and means for driving said rotatable member by means of the combustion gases.

8. In a jet propulsion unit, a plurality of stationary sections including an outer section provided with an air duct, and carrying on the inside the stationary blades of a compressor, an adjoining outer section, an inner centrally located stationary section, an inner rotatable member carrying on the outside the movable blades of a compressor arranged in operative relation to the above mentioned fixed parts of the same, said rotatable member being provided with an elongated combustion chamber, a hub member for said rotatable member, a helical supporting member on said hub member, said hub member being journalled on said inner centrally located stationary section, and a turbine with stationary members attached to said inner stationary section and with movable members attached to the inside of said rotatable member.

9. In a jet propulsion unit, a rotatable combustion chamber, means for supplying the same with compressed air, means for conducting the compressed air supply along the outside of the combustion chamber and around one end thereof, provided with an admission opening, stationary sections, including a centrally located member, means for rotatably supporting said rotatable combustion chamber on the centrally located stationary member, and means for driving said rotatable member including a turbine with fixed member attached to said centrally located stationary member and with movable members attached to the inside of the rotatable member.

10. In a jet propulsion unit, a plurality of outer sections forming an outer stationary assembly, and including an end section, an inner centrally located supporting member, a tubular gas flow directing section filling part of the inside of said outer sections and supporting said inner central supporting member, a rotatable member with an admission opening and a discharge end arranged within one of the above named outer sections and within an outer end section, the latter being arranged at a distance from the rotatable member so as to form an annular channel around the rotatable member, a compressor with stationary blades mounted in the first named outer section and with movable parts cooperating with the said stationary blades mounted on the outside of the rotatable member, said compressor delivering compressed air into the annular channel, a flow reversing head on said outer end section at the end of the annular channel for directing the compressed air flowing around the rotatable member into the admission opening of the same, fuel injecting and igniting means in said flow reversing head, movable turbine blades on the discharge end of the rotatable member, and stationary turbine blades cooperating therewith arranged on the end portion of the central inner supporting member, said turbine discharging into the tubular portion of said gas flow directing section filling part of the inside of an outer section and a jet discharge section attached to said tubular section.

JOHN A. MELENRIC.

REFERENCES CITED

The following references are of record in the file of this patent:

UNITED STATES PATENTS

| Number | Name | Date |
|---|---|---|
| 1,331,766 | Hemingway | Feb. 24, 1920 |
| 1,960,810 | Gordon | May 29, 1934 |
| 2,326,072 | Seippel | Aug. 3, 1943 |

FOREIGN PATENTS

| Number | Country | Date |
|---|---|---|
| 585,398 | Great Britain | Feb. 6, 1947 |